UNITED STATES PATENT OFFICE.

WESLEY T. KILLINGWORTH, OF AUGUSTA, GEORGIA.

AGUE REMEDY.

SPECIFICATION forming part of Letters Patent No. 282,091, dated July 31, 1883.

Application filed June 8, 1883. (No specimens.)

*To all whom it may concern:*

Be it known that I, WESLEY T. KILLINGWORTH, a citizen of the United States of America, residing at Augusta, in county of Richmond and State of Georgia, have invented certain new and useful Improvements in Medical Compounds for the Cure of Chills and Fevers; and I do hereby declare the following to be a full, clear, and exact description of the invention, such as will enable others skilled in the art to which it appertains to make and use the same.

My compound is to be used for treating chills and fevers; and it consists of the following ingredients, combined in the proportions stated, namely: rhubarb, three hundred grains; aloes, three hundred grains; Dover's powder, three hundred grains; carbonate of iron, three hundred grains; gamboge, one hundred grains; iodine, fifty grains; lunar caustic, thirty grains; water, one pint; good gin, three and one-half quarts. The rhubarb, aloes, Dover's powder, carbonate of iron, gamboge, iodine, and lunar caustic are first mixed in the water, after which the gin is added. The compound is now ready for use, and is administered in doses from one-half of a teaspoonful and upward, depending on the age of the person using it. The dose is preferably administered at six, eight, and ten o'clock in the morning and repeated at six, eight, and ten o'clock at night.

Having thus fully described the nature and merits of my invention, what I claim as new is—

The hereinbefore-described compound to be used in the treatment of chills and fevers, consisting of rhubarb, aloes, Dover's powder, carbonate of iron, gamboge, iodine, lunar caustic, water, and gin, combined in the proportions substantially as specified.

In testimony whereof I affix my signature in presence of two witnesses.

WESLEY T. KILLINGWORTH.

Witnesses:
W. M. TIMBERLAKE,
THOMAS S. BEAN.